United States Patent
Urisu

(10) Patent No.: US 7,239,128 B2
(45) Date of Patent: Jul. 3, 2007

(54) LIQUID CRYSTAL MODULE INSPECTING APPARATUS AND LIQUID CRYSTAL MODULE

(75) Inventor: Takayoshi Urisu, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 0 days.

(21) Appl. No.: 11/103,160

(22) Filed: Apr. 11, 2005

(65) Prior Publication Data

US 2005/0246128 A1     Nov. 3, 2005

(30) Foreign Application Priority Data

Apr. 16, 2004   (JP)   ............................. 2004-121695

(51) Int. Cl.
   *G01R 31/00*   (2006.01)
(52) U.S. Cl. .................... 324/158.1; 324/770
(58) Field of Classification Search ................ None
   See application file for complete search history.

(56) References Cited

U.S. PATENT DOCUMENTS 4,024,531 A * 5/1977 Ashby ................. 345/59
4,197,590 A * 4/1980 Sukonick et al. ........ 715/781
4,357,671 A * 11/1982 Miller ................. 345/530
5,479,184 A * 12/1995 Tokumitsu ............. 345/3.1

FOREIGN PATENT DOCUMENTS

| JP | 2003-166246 | | 6/2000 |
| JP | 2003047729 A | * | 2/2003 |
| KR | 2004077013 A | * | 9/2004 |

* cited by examiner

*Primary Examiner*—Paresh Patel
(74) *Attorney, Agent, or Firm*—Peter Ganjian

(57) ABSTRACT

An inspection and adjustment of a liquid crystal module have required a number of processes, which has been inefficient.

According to the present invention, OSD image data is stored in a ROM 42 of a liquid crystal module 10, and the liquid crystal module 10 can independently display a plurality of test patterns simply by receiving a remote-control signal from a remote-control signal transmitter 60. Therefore, simply by putting the liquid crystal module on an inspection line 70, at each inspection station 71, a display pattern necessary for each inspection and adjustment is automatically switched and shown. Therefore, the inspection and adjustment of the liquid crystal module can be conducted without a process of connecting an exclusive substrate 110 and an image data generator 120 which used to be required only during the inspection and adjustment of each liquid crystal module 10 and a process for a worker to operate a prescribed device every time the type of inspection changes.

10 Claims, 5 Drawing Sheets

LIQUID CRYSTAL MODULE INSPECTING APPARATUS AND LIQUID CRYSTAL MODULE

BACKGROUND OF THE INVENTION

1. Field of the Invention

The present invention relates to a liquid crystal module inspection apparatus and a liquid crystal module. In particular, it relates to a liquid crystal module inspection apparatus and a liquid crystal module which are preferable for inspecting and adjusting the display function of a liquid crystal panel.

2. Description of the Prior Art

At a place where liquid crystal TV sets are manufactured, it is necessary, with respect to every one of the liquid crystal modules mounted on the TV sets, to have a test pattern shown on a liquid crystal panel and to inspect and adjust its display function. In the past, a prescribed test jig was connected to a liquid crystal module of every TV set, and the test pattern was displayed on the liquid crystal panel by feeding image data through the test jig.

Also, in a prior art, a method of inspecting an inverter is known wherein, in the inverter for motor drive equipped with a built-in liquid crystal display unit used when monitoring the operational status or setting operating modes, an operation-check state, which is different from a normal operating state, is prepared and the liquid crystal display is evaluated on a pass/fail basis by turning on and off all the pixels of the liquid crystal display unit according to a test program (see for example, JP2000-166246A).

In the inspection and adjustment described above, since the prescribed test jig has to be connected to every liquid crystal module through a patch code etc, operations were complicated and troublesome, resulting in considerably inefficient inspection and adjustment. Further, in this inspection and adjustment, it is necessary to show a plurality of test patterns on a liquid crystal panel to check the display function of the liquid crystal panel. In the past, it was required for a worker at each inspection line to operate the above test jig etc., and switch the test patterns.

According to the above patent document 1, in a product assembled as an inverter for motor drive, the liquid crystal display unit is evaluated on a pass/fail basis by switching to an operation-check state, which is different from a normal operating state. Also, a CPU having a built-in program to show a test pattern is, in a normal operating state, used for generating pulse-width modulation driving waveforms or normal transmission of data displayed on the liquid crystal display unit etc. Thus, it is in charge of the overall drive control of the inverter for motor drive. Therefore, in the invention of the above patent document 1, even when some error is detected by showing a test pattern on the liquid crystal display unit, it is not possible to judge whether it is caused by the liquid module itself of the liquid crystal display unit or by other parts such as the ones of the CPU or the inverter for motor drive. Further, in order to evaluate the liquid crystal display unit on a pass/fail basis, it is necessary to turn on or off the switch 3 or to connect the setting device 4. Therefore, the problem of requiring a troublesome connecting process and switching operation remains unsolved.

SUMMARY OF THE INVENTION

The present invention is made in view of the above, and its object is to provide a liquid crystal module inspecting apparatus and a liquid crystal module wherein an inspection of the liquid crystal module can be conducted reliably and efficiently.

In order to achieve the above object, one aspect of the present invention resides in a liquid crystal module inspecting apparatus showing a prescribed test pattern on a liquid crystal panel and inspecting an image display function of the liquid crystal panel, the liquid crystal inspecting apparatus comprising: i) the liquid crystal module including a) the liquid crystal panel; b) a microcomputer comprising a storage unit storing test image data for showing a plurality of test patterns and an OSD (On-Screen Display) display circuit capable of showing each of the plurality of test patterns on the liquid crystal panel based on the test image data; and c) a remote-control signal receiver connected to the microcomputer and outputting an electric signal based on a remote-control signal received from an outside source to the microcomputer; and ii) a remote-control signal transmitter transmitting a prescribed remote-control signal for showing a test pattern corresponding to a particular inspection conducted at each inspection station to the remote-control signal receiver when the liquid crystal module moves to one of inspection stations provided at a plurality of locations, wherein the liquid crystal module is capable of independently showing the test pattern on the liquid crystal panel based on the remote-control signal without being connected to other devices.

According to the aspect of the present invention configured as above, a prescribed test pattern is shown on the liquid crystal panel and an inspection with respect to the display function of the liquid crystal panel is conducted. Therefore, the liquid crystal module inspecting apparatus comprises a liquid crystal module to be inspected and a remote-control signal transmitter transmitting a remote-control signal to the liquid crystal module. The liquid crystal module mentioned here is in a state before being incorporated into a liquid crystal TV set as a finished product.

Under such a configuration, when the liquid crystal module moves to one of the inspection stations provided at a plurality of locations on the inspection line, the remote-control signal transmitter transmits a prescribed remote-control signal for showing a test pattern corresponding to a particular inspection conducted at each inspection station to the above remote-control signal receiver.

On the other hand, the remote-control signal receiver is connected to the above microcomputer and outputs an electric signal based on the received remote-control signal to the microcomputer. The microcomputer controls the OSD display circuit based on the remote-control signal, and has the liquid crystal panel show a particular test pattern of the plurality of test patterns based on the test image data stored in the storage unit. As a result, the above liquid crystal module independently shows on the liquid crystal panel a test pattern corresponding to a particular inspection at each inspection station based on the above remote-control signal without being connected to other devices.

Thus, the liquid crystal module having received a specific remote-control signal at each inspection station can independently show a test pattern. Therefore, it does not have to be connected to other devices during the inspection and adjustment of each set, thereby considerably reducing the labor for the inspection and adjustment of the liquid crystal module. Also, switching of the test pattern is automatically performed when the liquid crystal module moves to each inspection station, conserving the time and labor for a worker to do it.

According to another aspect, the present invention provides a liquid crystal module inspecting apparatus showing a prescribed test pattern on a liquid crystal panel and inspecting a liquid crystal panel, the liquid crystal module inspecting apparatus comprising: i) the liquid crystal module including a) the liquid crystal panel; b) a storage unit storing test image data for showing prescribed test patterns; c) a test pattern display circuit showing a prescribed test pattern on the liquid crystal panel based on the test image data; and d) an instruction signal receiver being connected to the test pattern display circuit and outputting an electric signal based on an instruction signal received from an outside source to the test pattern display circuit; and ii) an instruction signal transmitter transmitting an instruction signal for showing the test pattern to the instruction signal receiver of the liquid crystal module, wherein the liquid crystal module is capable of independently showing the test pattern on the liquid crystal panel based on the instruction signal without being connected to other devices.

When configured as above, the inspection of the liquid crystal panel is conducted by showing a prescribed test pattern on the liquid crystal panel. The liquid crystal module inspecting apparatus comprises a liquid crystal module to be inspected and an instruction signal transmitter transmitting an instruction signal to the liquid crystal module. Under such a configuration, the instruction signal transmitter transmits an instruction signal for showing the above test pattern to the instruction signal receiver of the liquid crystal module. On the other hand, upon receipt of the instruction signal, the instruction signal receiver outputs an electric signal based on the instruction signal to the test pattern display circuit. Then, according to the control by the instruction signal, the test pattern display circuit obtains test image data for showing a prescribed test pattern from the storage unit and displays the prescribed test pattern on the liquid crystal panel based on the test image data.

Namely, upon receipt of the above instruction signal, the liquid crystal module can automatically show the above test pattern on the liquid crystal panel in dependently. Therefore, it does not have to be connected to other devices during the inspection and adjustment of each set, thereby considerably reducing the labor for the inspection and adjustment of the liquid crystal module.

According to another aspect of the present invention, the above test pattern display circuit may be a microcomputer comprising an OSD display circuit. Based on the above instruction signal, the microcomputer may output a control signal for having the OSD display circuit display a prescribed test pattern. Based on the control signal, the OSD display circuit may obtain test image data for the test pattern from the above storage unit and display the test pattern based on the image data.

When configured as above, based on the above instruction signal, the microcomputer outputs the control signal for having the OSD display circuit display the prescribed test pattern. Then, based on the control signal, the OSD display circuit obtains test image data for the test pattern from the above storage unit and has the liquid crystal panel show the test pattern based on the test image data. Namely, by providing the liquid crystal module itself with an OSD display function, it becomes unnecessary to connect other devices such as a main substrate required for displaying image to the liquid crystal module. Thus, the liquid crystal module can independently and easily display the test pattern.

According to still another aspect of the present invention, when the liquid crystal module moves to one of the inspection stations provided at a plurality of locations, the above instruction signal transmitter transmits a prescribed instruction signal for showing a test pattern corresponding to a particular inspection conducted at each inspection station to the instruction signal receiver. The above liquid crystal module stores test image data corresponding to each of the plurality of test patterns in the above storage unit and, at each inspection station, being based on the above instruction signal, displays a test pattern corresponding to a particular inspection conducted at each inspection station.

When configures as above, the above storage unit stores the test image data corresponding to each of the plurality of test patterns. When the liquid crystal module moves to one of the inspection stations provided at a plurality of locations, the instruction signal transmitter transmits a prescribed instruction signal for showing a test pattern corresponding to a particular inspection conducted at each inspection station to an instruction signal receiver. As a result, at each inspection station, the liquid crystal module displays a test pattern corresponding to a particular inspection conducted at each inspection station. Normally, in the inspection and adjustment of the liquid crystal module, a plurality of test patterns corresponding to a plurality of items for inspection are displayed. According to the above configuration, test patterns are automatically switched and displayed simply by moving the liquid crystal module to each inspection station. Therefore, a plurality of inspections and adjustment can be conducted quite efficiently.

So far, an explanation of the invention as the liquid crystal module inspecting apparatus comprising the liquid crystal module and the instruction signal transmitter has been given. However, the invention can be viewed as the liquid crystal module to be inspected itself. Therefore, according to yet another aspect of the present invention, the liquid crystal module may comprise: a liquid crystal panel as an image display element; a storage unit storing test image data for showing a prescribed test pattern; a test pattern display circuit showing a prescribed test pattern on the liquid crystal panel based on the test image data; and an instruction signal receiver being connected with the test pattern display circuit and outputting an electric signal based on an instruction signal for showing the test pattern received from an outside source to the test pattern display circuit, so that the liquid crystal module can independently display the test pattern on the liquid crystal panel based on the above instruction signal without being connected to other devices.

As described above, according to the present invention, when inspecting and adjusting the liquid crystal module, it is not necessary to connect it with other devices. Therefore, it is possible to conduct inspections and adjustment of a plurality of items for sets in large quantities with less labor and time. Also, a test pattern is replaced with another simply by moving the liquid crystal module to each adjusting station. Therefore, the switching operation of the test patterns by a worker is unnecessary, further increasing the efficiency of the inspection and adjustment of the liquid crystal module.

Other and further objects, features and advantages of the invention will appear more fully from the following description.

DESCRIPTION OF THE PREFERRED EMBODIMENTS

Figure 5:
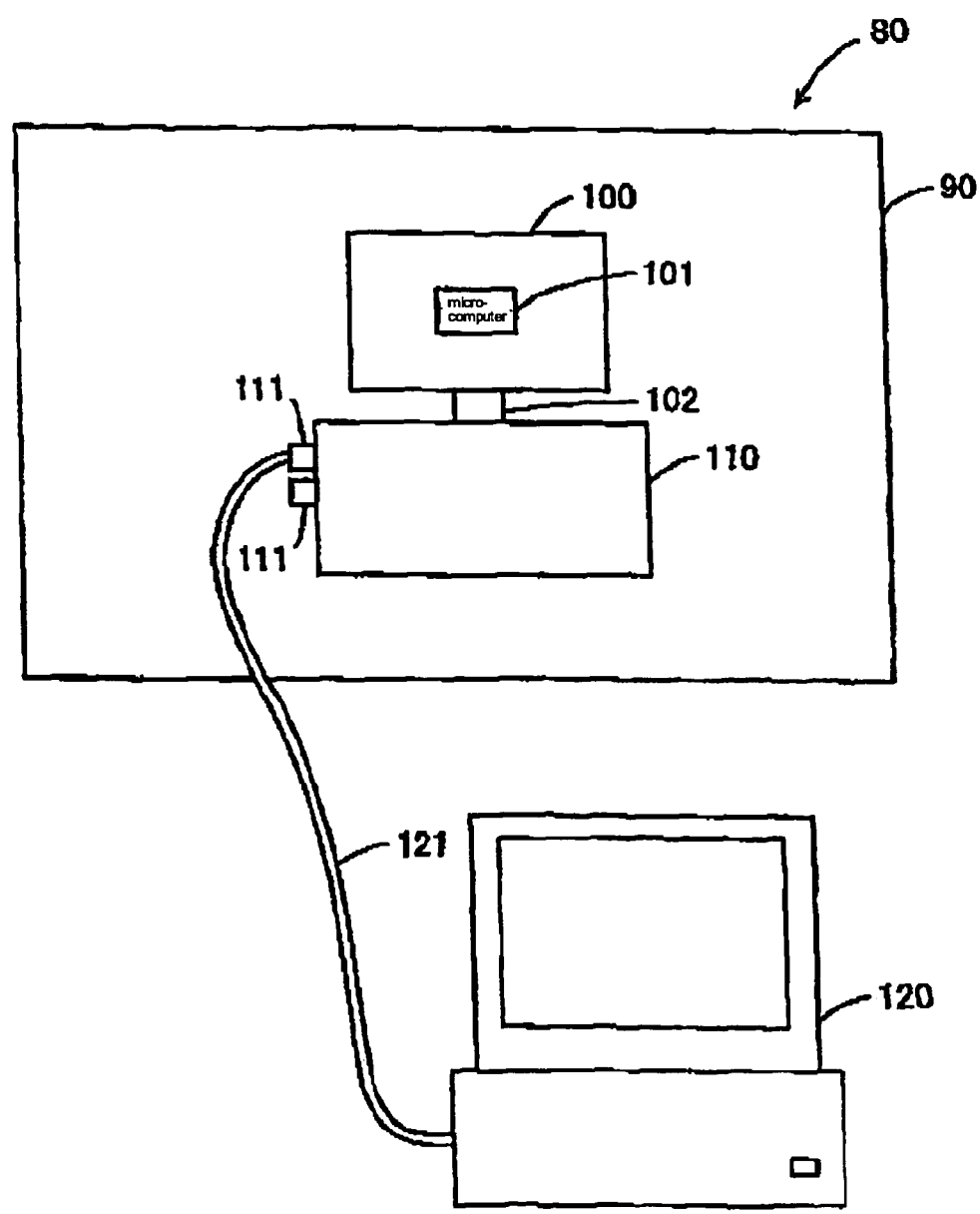
FIG. 5 is a rear view showing a conventional inspection and adjustment of a liquid crystal module being conducted.

FIG. 5 schematically shows an embodiment of the conventional inspection and adjustment of the liquid crystal module. FIG. 5 shows a rear view of the liquid crystal module 80. The liquid crystal module 80 comprises a liquid crystal panel 90 as an image display element and a substrate 100 mounted at a prescribed position on the back of the liquid crystal panel 90. A microcomputer 101 comprising a CPU, a ROM, and a RAM, etc., is mounted on the substrate 100. The microcomputer 101 is mounted as a one-chip IC comprising a timing control circuit for displaying image data on the liquid crystal panel 90.

With the configuration of the above liquid crystal module 80 alone, an image cannot be shown on the screen of the liquid crystal panel 90. Therefore, in order to display a test pattern for inspection and adjustment, it was necessary to send image data corresponding to the test pattern from an outside device to the liquid crystal module 80. Therefore, in the conventional inspection and adjustment of the liquid crystal module 80, as shown in FIG. 5, the liquid crystal module 80 is connected to its exclusive substrate 110 and an image data generator 120.

The image data generator 120 generates image data corresponding to test patterns displayed during the inspection and adjustment of the liquid crystal module 80 to be conducted with respect to a plurality of items, and sends the image data to the liquid crystal module 80 through a cable 121. On the other hand, normally, the substrate 100 to be mounted on the liquid crystal module 80 as a standalone unit is not equipped with a jack etc. for connection to cables of outside devices. Therefore, the above exclusive substrate 110 equipped with jacks 111 for connection to the cable 121, a power supply circuit for supplying power to the liquid crystal module 80, etc. is provided at a prescribed position of the above liquid crystal panel 90 only for the inspection and adjustment and is connected with the substrate 100 through a connector 102.

With such a configuration, when a worker operates the image data generator 120, the image data is sent to the substrate 100 through the cable 121 and the exclusive substrate 110. Then, when the microcomputer 101 exercises prescribed control, a test pattern based on the image data is shown on the liquid crystal panel 90. Thus, in the conventional inspection and adjustment of the liquid crystal module 80, it was necessary to connect the liquid crystal module 80 of each set with the above image data generator 120 and the exclusive substrate 110. Also, when changing the test pattern, it was necessary for a worker to operate the image data generator 120 to do it.

Therefore, in the invention of the present application, the following configuration is adopted.

Figure 1:
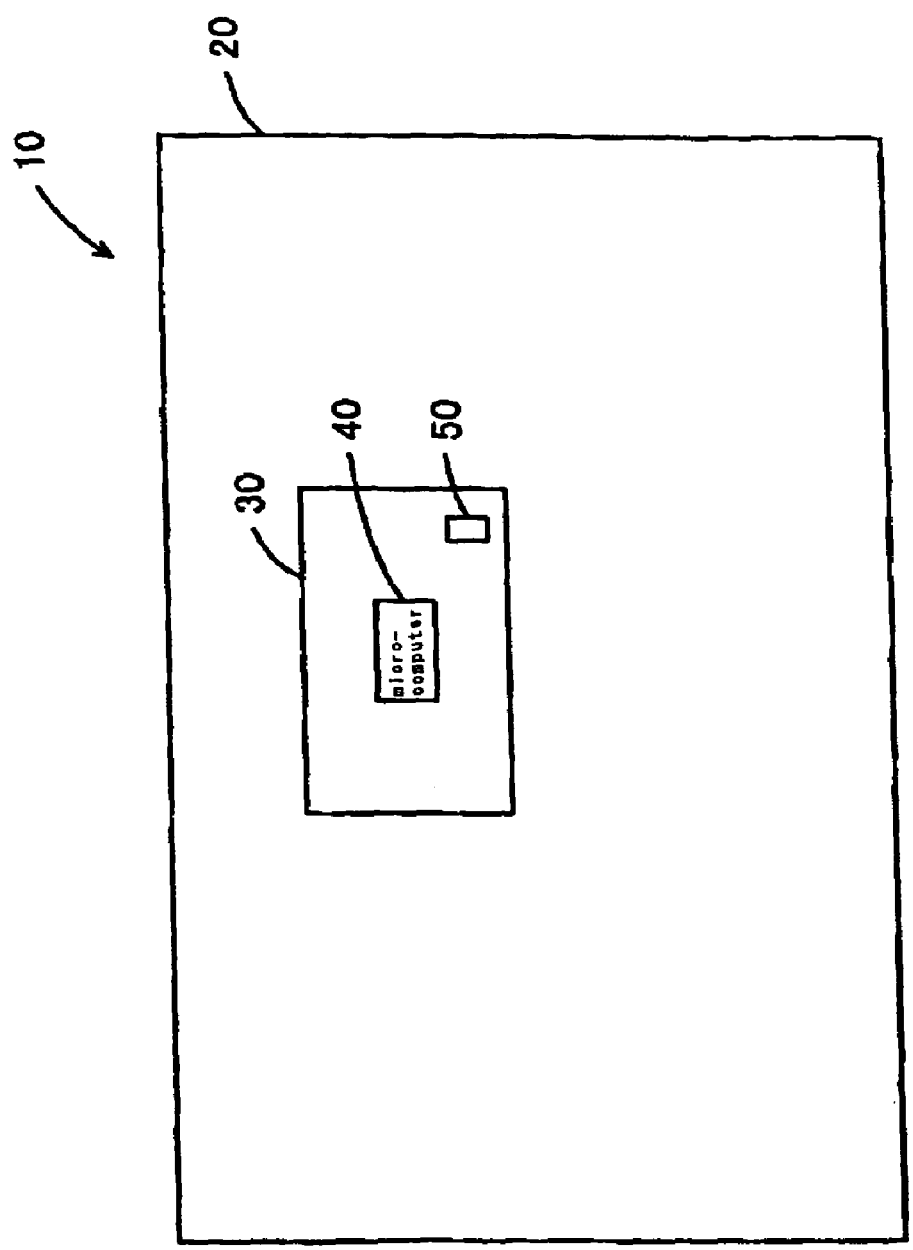
FIG. 1 is a rear view of a liquid crystal module according to the present application.

FIG. 1 shows the liquid crystal module 10 according to the present application from a rear side. In FIG. 1, as in the above liquid crystal module 80, a substrate 30 is mounted at a prescribed position on the rear side of the liquid crystal panel 20. However, unlike the conventional method, a prescribed inspection and adjustment are conducted without connecting other components than the liquid crystal module 10, namely, the above exclusive substrate 110 and the image data generator 120. A microcomputer 40 and a remote-control signal receiver 50 are mounted on the substrate 30.

Figure 2:
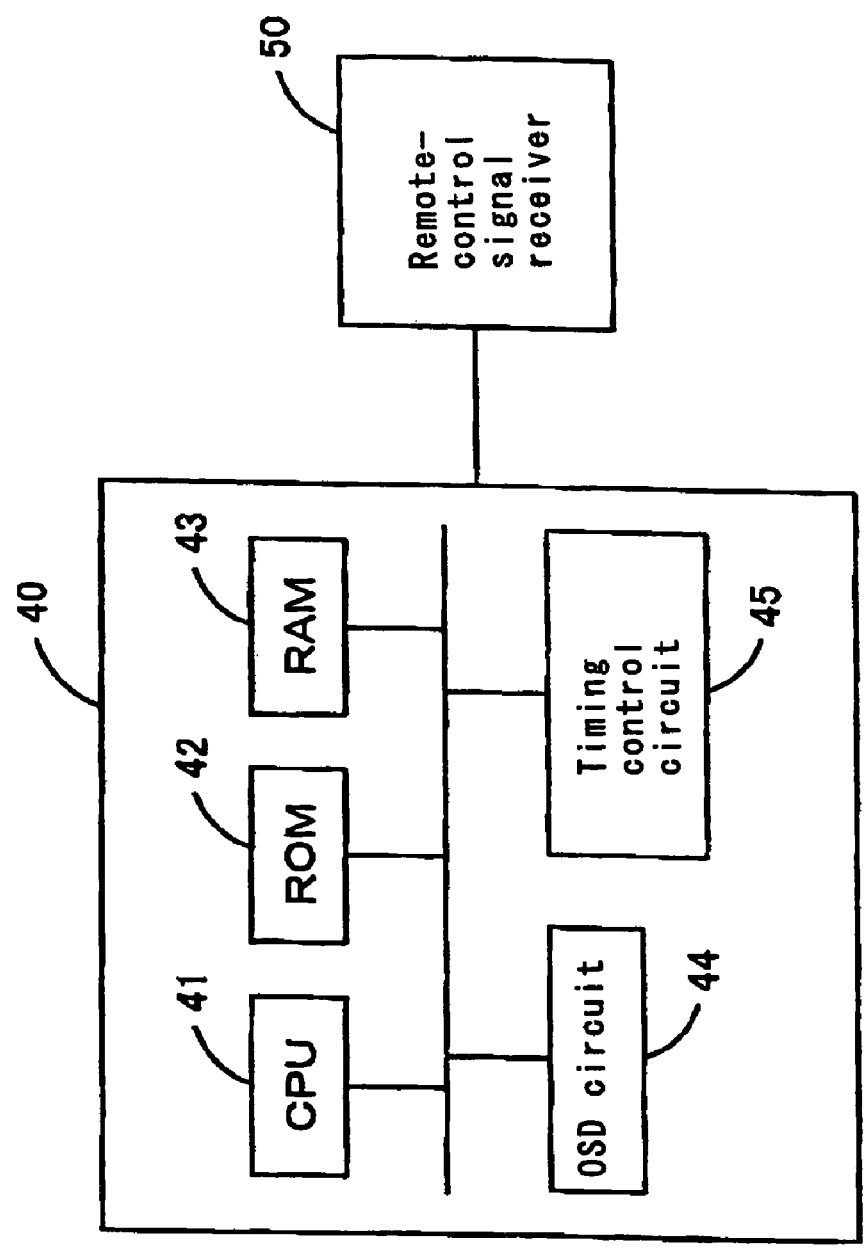
FIG. 2 is a block diagram showing a microcomputer and a remote-control signal receiver.

FIG. 2 shows the above microcomputer 40 and the remote-control signal receiver 50. As shown in FIG. 2, the microcomputer 40 comprises a CPU 41 as a central processing unit, a ROM 42 or a semiconductor memory which is not rewritable, a RAM 43 or a rewritable semiconductor memory, and a timing control circuit 45. Also, according to the present application, the microcomputer 40 comprises an OSD circuit 44 for showing a plurality of test patterns on the liquid crystal panel 20, and OSD image data corresponding to the plurality of test patterns are stored in the ROM 42.

The test pattern display circuit is composed of the microcomputer 40. In particular, it is composed of the OSD circuit 44 and the timing control circuit 45. Also, the OSD display circuit is composed of the OSD circuit 44, the timing control circuit 45, and the ROM 42.

In this configuration, when the remote-control signal receiver 50 receives a prescribed remote-control signal sent from a remote-control signal transmitter 70 to be described later, the remote-control signal receiver 50 photoelectrically converts the remote-control signal and sends the obtained electric signal to the microcomputer 40. Upon receipt of the electric signal, the CPU 41 outputs an on-screen display control signal corresponding to an instruction of the remote-control signal to the OSD circuit 44. Based on the on-screen display control signal, the OSD circuit 44 obtains OSD image data for showing a test pattern specified by the control signal from the ROM 42.

The above OSD image data is a group of bit-map data zoned by a dot size (hereafter, character size) of a character that the OSD circuit 44 can display, and each character size of it has information about a position where the character is displayed and RGB (red, green, and blue) gradation data of each pixel (character data). Namely, in the ROM 42, as OSD image data corresponding to one test pattern, the character data as much as the number of characters that can be displayed on a screen are stored. As an example of the on-screen display, it is conceivable that the OSD circuit 44 is capable of selecting a mode for showing 80 characters×25 lines on a screen of 640×480 dots.

The OSD circuit 44 outputs the OSD image data obtained based on the above on-screen display control signal to the timing control circuit 45. The timing control circuit 47 is an electronic circuit which, being based on the supplied OSD image data, performs control-drive processing of display on the screen. It generates control-signal voltage to drive, for every -pixel and color, an R-liquid crystal panel, a G-liquid crystal panel, and a B-liquid crystal panel. Further, the liquid crystal panel 20 is equipped with a back light (not shown). This backlight is turned on by the high voltage supplied by an inverter (not shown), and the illuminating light passes through the liquid crystal panel 20 from the rear of the liquid crystal panel 20 to the front. Thus, the liquid crystal module 10 shows a prescribed test pattern on the liquid crystal panel 20. Namely, unlike the one in the prior art, the liquid crystal module 10 can independently show the test pattern simply by receiving a prescribed remote-control signal.

Now, a specific aspect of showing a test pattern according to the present embodiment will be described.

Figure 3:
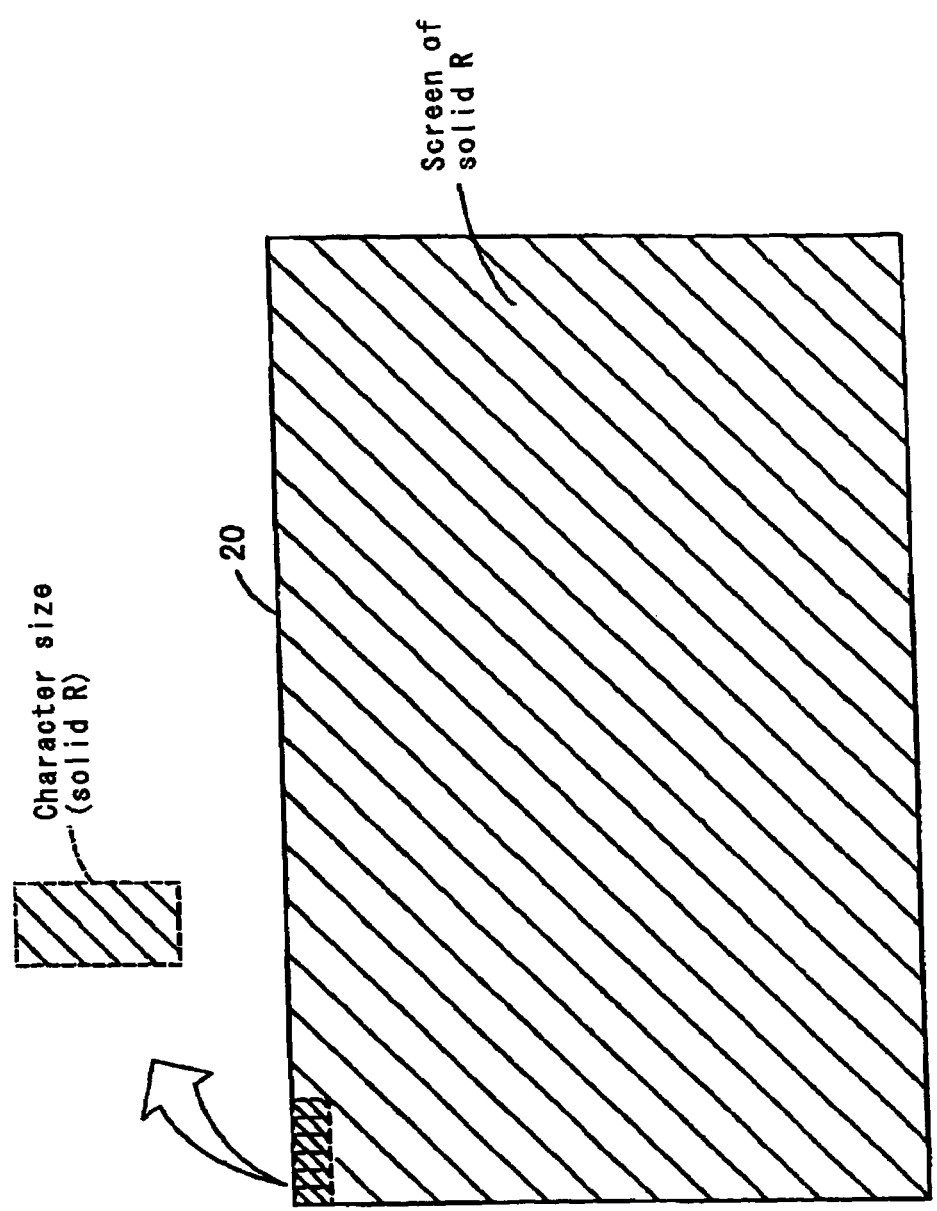
FIG. 3 illustrates a test pattern shown on a liquid crystal panel.

FIG. 3 shows an example in which a test pattern (screen of solid R) is displayed on the liquid crystal panel 20. When displaying the test pattern of FIG. 3, OSD image data having character data as much as the number of characters that can be displayed on one screen is obtained from the above ROM 42. In the above character data, RGB gradation data is to be set such that its R value is maximum and GB value is minimum with respect to all the pixels of the character size. All the character sizes are filled with R only by performing the display based on such OSD image data, and the whole screen appears to be in solid R. In the same way, it is possible to show screens of solid G, B, white, and black. Thus, by showing such screens on the liquid crystal panel 20, it is inspected whether or not each pixel is lit in normal color saturation. In addition to the above, it is possible to conduct each prescribed inspection and adjustment by showing a gray-scale screen of 2 levels, a mono-scope pattern, and a mosaic pattern for adjusting flicker, etc.

The OSD image data corresponding to each test pattern may not be formed by using the above character size as a unit, and it may be a group of pixel data specifying RGB gradation data for each pixel and a position where it is displayed. Namely, RGB gradation data of pixels making up a screen of a test pattern, and numbers and coordinates, etc. of pixels corresponding to the gradation data are stored in the ROM 42. Being based on such OSD image data, the timing control circuit 45 generates control-signal voltage for each pixel, and controls driving the horizontal and vertical scanning lines to display the image by each pixel.

Figure 4:
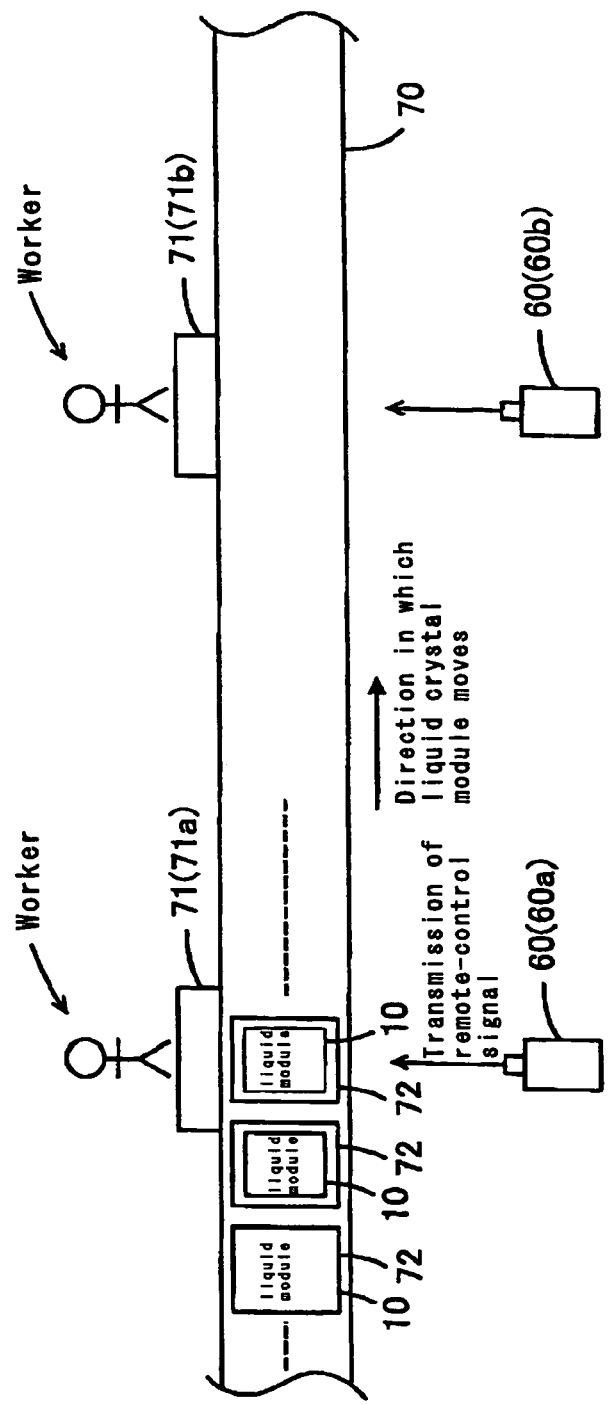
FIG. 4 illustrates an embodiment of the inspection and adjustment of liquid crystal modules in a factory.

FIG. 4 shows one aspect when inspecting and adjusting liquid crystal modules 10 in a factory. In FIG. 4, a plurality of liquid crystal modules 10 move in one direction on an inspection line 70. Each liquid crystal module 10 moves on a palette 72 on the inspection line 70. A power supply unit (not shown) is provided to each palette 72, and each liquid crystal module 10 obtains voltage for drive necessary when showing a test pattern from the power supply unit.

At a plurality of locations of the inspection line 70, inspection stations 71 are provided at prescribed intervals. A remote-control signal transmitter 60 is provided near each inspection station 71. Further, a worker is positioned at each inspection station 71 to visually check the test pattern. Each remote-control signal transmitter 60 transmits remote-control signals of different frequencies by radio. Namely, when arriving at an inspection station 71a, each liquid crystal module 10 moving on the inspection line 70 receives a remote-control signal transmitted from a corresponding remote-control signal transmitter 60a by the remote-control signal receiver 50. The remote-control signal transmitted by the remote-control signal transmitter 60a includes an instruction signal for having the liquid crystal module 10 display a test pattern to be shown during the inspection and adjustment at the corresponding inspection station 71a. Therefore, being based on the remote-control signal from the remote-control signal transmitter 60a, the liquid crystal module 10 having moved to the inspection station 71a can automatically show a particular test pattern for the inspection and adjustment conducted on the inspection station 71a.

At the inspection station 71a, when the particular test pattern is shown on the liquid crystal panel 20, a worker positioned at the inspection station 71a visually checks the displayed test pattern. Then, the worker checks the output state of the test pattern and conducts prescribed output adjustment if necessary. When the inspection and adjustment at the inspection station 71a are over, the liquid crystal module 10 moves to the next inspection station 71b. Again, at the inspection station 71b, by receiving a remote-control signal from the corresponding remote-control signal transmitter 60b, the test pattern is automatically switched to the one necessary for the inspection and adjustment conducted at the inspection station 71b.

Thus, according to the configuration of the present application, simply by putting the liquid crystal module 10 on the inspection line 70, a display pattern such as a display of a screen of solid color necessary for each inspection and adjustment described above is automatically switched and shown at each inspection station 71. Accordingly, the process to connect the above exclusive substrate 110 and the image data generator 120 required only for the inspection and adjustment of each liquid crystal module 10 becomes unnecessary. Also, the process for the worker to operate a prescribed device to change the test pattern every time the type of the inspection changes becomes unnecessary. Therefore, the efficiency of the inspection and adjustment of the liquid crystal module 10 is considerably increased, and liquid crystal modules 10 in large quantities can be manufactured in a short time.

Further, according to the present application, the following effects can be brought about by enabling the liquid crystal module 10 as one unit to display each test pattern. When external devices other than the liquid crystal module 10 are connected to show a test pattern, it is hard to judge, when some abnormality is found in the shown result, whether the abnormality is caused simply by a problem of the liquid crystal module 10 or problems of other devices than the liquid crystal module 10. According to the present invention, as described above, the liquid crystal module 10 can independently show each test pattern. Therefore, even when some abnormality is detected in the displayed result, it is easier to find the cause of the abnormality compared to the conventional case, further contributing to the efficiency of the inspection and adjustment of each liquid crystal module 10.

The foregoing invention has been described in terms of preferred embodiments. However, those skilled, in the art will recognize that many variations of such embodiments exist. Such variations are intended to be within the scope of the present invention and the appended claims.

What is claimed is:

1. The liquid crystal module inspecting apparatus showing a prescribed test pattern on a liquid crystal panel and inspecting a liquid crystal module, the liquid crystal module inspecting apparatus comprising:
   the liquid crystal module including the liquid crystal panel;
   a storage unit in which test image data for showing prescribed test patterns are stored;
   a test pattern display circuit showing a prescribed test pattern on the liquid crystal panel based on the test image data; and
   an instruction signal receiver being connected to the test pattern display circuit and outputting an electric signal based on an instruction signal received from an outside sources to the test pattern display circuit; and
   an instruction signal transmitter transmitting an instruction signal for showing the test pattern to the instruction signal receiver of the liquid crystal module,
   wherein the liquid crystal module is capable of independently showing the test pattern on the liquid crystal panel being based on the instruction signal without being connected to other devices.

2. The liquid crystal module inspecting apparatus according to claim 1, wherein the test pattern display circuit is a microcomputer comprising an OSD display circuit;
   wherein the microcomputer outputs a control signal for showing a prescribed test pattern on the OSD display circuit based on the instruction signal; and wherein the OSD display circuit obtains test image data corresponding to the test pattern from the storage unit based on the control signal and shows the test pattern based on the image data.

3. The liquid crystal module inspecting apparatus according to claim 2, wherein the OSD display circuit comprises:
   an OSD circuit for showing a plurality of test patterns on a liquid crystal panel;
   a timing control circuit exercising control of driving the display based on supplied OSD image data; and
   a ROM in which OSD image data corresponding to the plurality of test patterns are stored.

4. The liquid crystal module inspecting apparatus according to claim 3, wherein a CPU of the microcomputer outputs an on-screen display control signal to the OSD circuit;
   wherein the OSD circuit outputs OSD image data obtained based on the on-screen display control signal to the timing control circuit; and
   wherein the timing control circuit generates control signal voltage for driving an R-liquid crystal panel, a G-liquid crystal panel, and a B-liquid crystal panel for each pixel and color.

5. The liquid crystal module inspecting apparatus according to claim 3, wherein the test patterns include a gray-scale screen of two levels, a mono-scope pattern, and a mosaic pattern for adjusting flicker, each of them using a character size as a unit.

6. The liquid crystal module inspecting apparatus according to claim 3, wherein the test pattern is a group of pixel data each pixel of which specifies RGB gradation data and where it is displayed.

7. The liquid crystal module inspecting apparatus according to claim 1, wherein the instruction signal transmitter transmits, when the liquid crystal module moves to one of the inspection stations provided at a plurality of locations, a prescribed instruction signal for showing a test pattern corresponding to a particular inspection conducted at each inspection station to the instruction signal receiver; and
   wherein the liquid crystal module stores test image data corresponding to each of the plurality of test patterns in the storage unit and, at each inspection station, being based on the instruction signal, displays a test pattern corresponding to a particular inspection conducted at each inspection station.

8. A liquid crystal module inspecting apparatus showing a prescribed test pattern on a liquid crystal panel and inspecting a liquid crystal module, the liquid crystal module inspecting apparatus comprising:
   the liquid crystal module including the liquid crystal panel;
   a storage unit in which test image data for showing prescribed test patterns are stored;
   a test pattern display circuit showing a prescribed test pattern on the liquid crystal panel based on the test image data; and
   a remote-control signal receiver being connected to the test pattern display circuit and outputting an electric signal based on a remote-control signal received from an outside source to the test pattern display circuit; and
   a remote-control signal transmitter transmitting a remote-control signal for showing the test pattern to the remote-control signal receiver of the liquid crystal module, wherein the liquid crystal module is capable of independently showing the test pattern on the liquid crystal panel being based on the remote-control signal without being connected to other devices.

9. The liquid crystal module inspecting apparatus according to claim 8,
   wherein the test pattern display circuit is a microcomputer comprising an OSD display circuit;
   wherein the microcomputer outputs a control signal for showing a prescribed test pattern on the OSD display circuit based on the remote-control signal; and
   wherein the OSD display circuit obtains test image data corresponding to the test pattern from the storage unit based on the control signal and shows the test pattern based on the image data.

10. The liquid crystal module inspecting apparatus according to claim 8,
    wherein the remote-control signal transmitter transmits, when the liquid crystal module moves to one of the inspection stations provided at a plurality of locations, a prescribed remote-control signal for showing a test pattern corresponding to a particular inspection conducted at each inspection station to the remote-control signal receiver; and
    wherein the liquid crystal module stores test image data corresponding to each of the plurality of test patterns in the storage unit and, at each inspection station, being based on the remote-control signal, displays a test pattern corresponding to a particular inspection conducted at each inspection station.

\* \* \* \* \*